US012206108B2

(12) United States Patent
Xie et al.

(10) Patent No.: US 12,206,108 B2
(45) Date of Patent: Jan. 21, 2025

(54) LITHIUM SILICATE CATHODES FOR LITHIUM-ION BATTERIES

(71) Applicant: The Trustees of Indiana University, Indianapolis, IN (US)

(72) Inventors: Jian Xie, Zionsville, IN (US); Yadong Liu, Indianapolis, IN (US)

(73) Assignee: The Trustees of Indiana University, Bloomington, IN (US)

( * ) Notice: Subject to any disclaimer, the term of this patent is extended or adjusted under 35 U.S.C. 154(b) by 707 days.

(21) Appl. No.: 17/436,151

(22) PCT Filed: Mar. 5, 2020

(86) PCT No.: PCT/US2020/021107
§ 371 (c)(1),
(2) Date: Sep. 3, 2021

(87) PCT Pub. No.: WO2020/181046
PCT Pub. Date: Sep. 10, 2020

(65) Prior Publication Data
US 2022/0149372 A1    May 12, 2022

Related U.S. Application Data

(60) Provisional application No. 62/814,396, filed on Mar. 6, 2019.

(51) Int. Cl.
*H01M 4/58* (2010.01)
*C01B 32/184* (2017.01)
(Continued)

(52) U.S. Cl.
CPC ......... *H01M 4/5825* (2013.01); *C01B 32/184* (2017.08); *C01G 49/009* (2013.01);
(Continued)

(58) Field of Classification Search
CPC ............. H01M 4/5825; H01M 4/0471; H01M 2220/20; H01M 2220/30; H01M 4/625;
(Continued)

(56) References Cited

U.S. PATENT DOCUMENTS

2007/0009800 A1 * 1/2007 Barker .................. H01M 4/587
429/231.95
2012/0321953 A1    12/2012 Chen et al.
(Continued)

FOREIGN PATENT DOCUMENTS

CN          101800310 A         8/2010
CN          102142556 A  *      8/2011
(Continued)

OTHER PUBLICATIONS

Translation of CN108123120A (Year: 2017).*
(Continued)

*Primary Examiner* — Maria Laios
*Assistant Examiner* — Ziheng Lu
(74) *Attorney, Agent, or Firm* — Hartman Global IP Law; Gary M. Hartman; Domenica N. S. Hartman

(57) ABSTRACT

An improved nanocomposite cathode material for lithium-ion batteries and method of making the same. The nanocomposite cathode material includes lithium iron silicate based nanoparticles with a conductive matrix of graphene sheets. The nanoparticles may be doped with at least one anion or cation.

10 Claims, 12 Drawing Sheets

(51) Int. Cl.
*C01G 49/00* (2006.01)
*H01M 4/04* (2006.01)
*H01M 4/62* (2006.01)

(52) U.S. Cl.
CPC ......... *H01M 4/0471* (2013.01); *H01M 4/625* (2013.01); *C01B 2204/22* (2013.01); *C01P 2004/04* (2013.01); *C01P 2006/40* (2013.01); *H01M 2220/20* (2013.01); *H01M 2220/30* (2013.01)

(58) Field of Classification Search
CPC . C01B 32/184; C01B 2204/22; C01P 2006/40
See application file for complete search history.

(56) References Cited

U.S. PATENT DOCUMENTS

| | | | | |
|---|---|---|---|---|
| 2013/0207032 A1* | 8/2013 | Tan | ................. | H01M 10/0525 252/182.1 |
| 2014/0333264 A1 | 11/2014 | Dai | | |

FOREIGN PATENT DOCUMENTS

| | | | | |
|---|---|---|---|---|
| CN | 104009226 | A | | 8/2014 |
| CN | 106784625 | A * | 5/2017 | ............ H01M 4/136 |
| CN | 107394125 | A | | 11/2017 |
| CN | 108063227 | A | | 5/2018 |
| CN | 108123120 | A | | 6/2018 |
| WO | 2015146423 | A1 | | 10/2015 |

OTHER PUBLICATIONS

Armand et al., "Comparative computational investigation of N and F substituted polyoxoanionic compounds The case of Li2FeSiO4 electrode material", Jun. 2011, Electrochemistry Communications, vol. 13, 1047-1050 (Year: 2011).*
First Office Action dated Sep. 9, 2023 for Chinese Patent Application No. 202080032770.8, 22 pages.
Ashish, A.G. et al., "TiNb2O7/Graphene Hybrid Material as High Performance Anode for Lithium-Ion Batteries," Electrochimica Acta 176 (2015) pp. 285-292.
Lu, F. et al., "Enhancement of F-Doping on the Electrochemical Behavior of Carbon-Coated LiFePO4 Nanoparticles Prepared by Hydrothermal Route," Electrochimica Acta 56 (2011), pp. 8833-8838.
Singh, S. et al., "Impact of Cl Doping on Electrochemical Performance in Orthosilicate (Li2FeSiO4): A Density Functional Theory Supported Experimental Approach," ACS App. Mater. Interfaces 9 (2017), pp. 26885-26896.
Yan, Z. et al., "Synthesis and Characterization of In Situ Carbon-Coated Li2FeSiO4 Cathode Materials for Lithium Ion Battery," Journal of Alloys and Compounds 511 (2012), pp. 101-106.
Yang, J. et al., "Li2FeSiO4 Nanorods Bonded with Graphene for High Performance Batteries," J. Mater. Chem. A, 3 (2015) pp. 9601-9608.
Yang, J. et al., "Tuning Structural Stability and Lithium-Storage Properties by D-Orbital Hybridization Substitution in Full Tetrahedron Li2FeSiO4 Nanocrystal," Nano Energy 20, (2016), pp. 117-125.
International Search Report and Written Opinion issued by the ISA/US, Commissioner for Patents, dated Jun. 5, 2020, for International Application No. PCT/US2020/021; 7 pages.

* cited by examiner

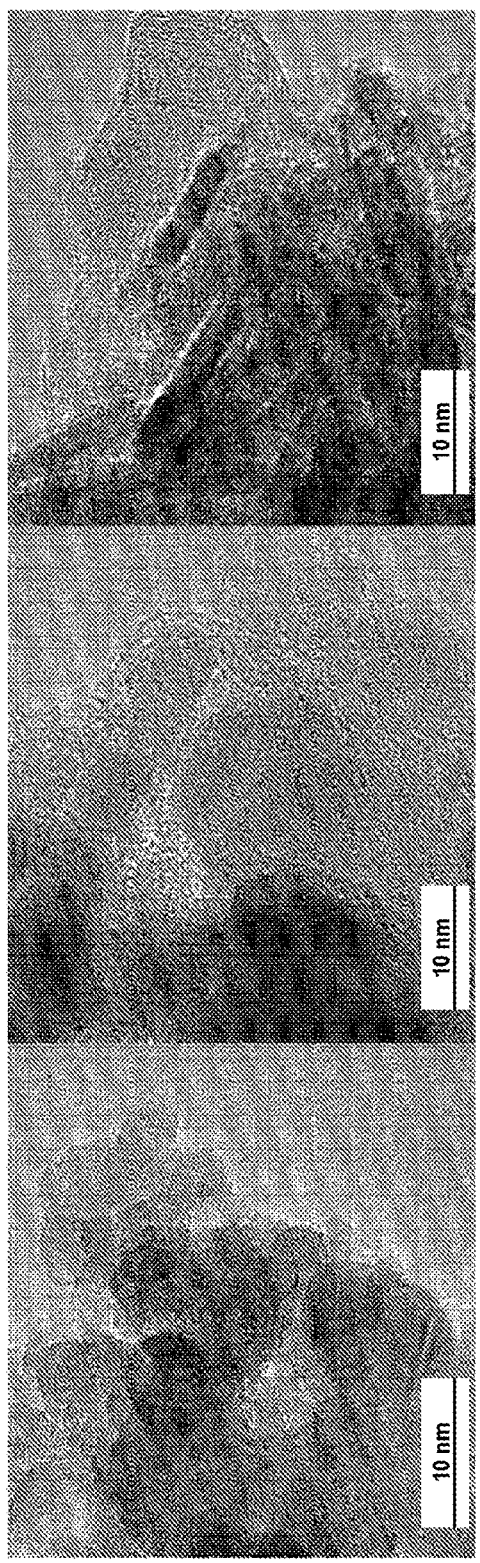

FIG. 8A
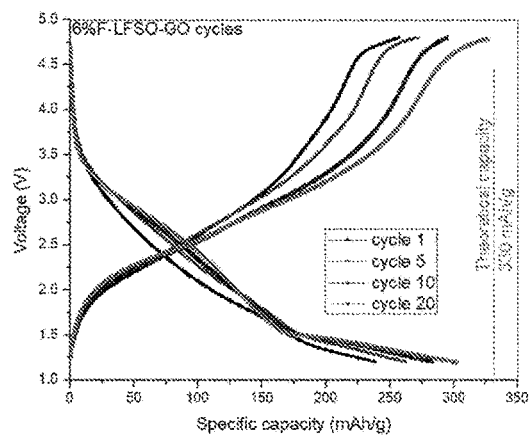
FIG. 8B
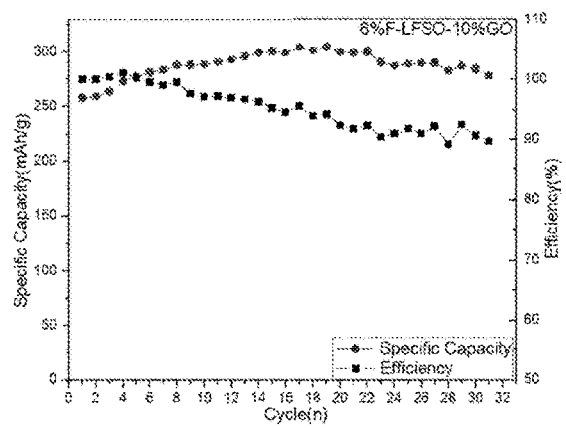
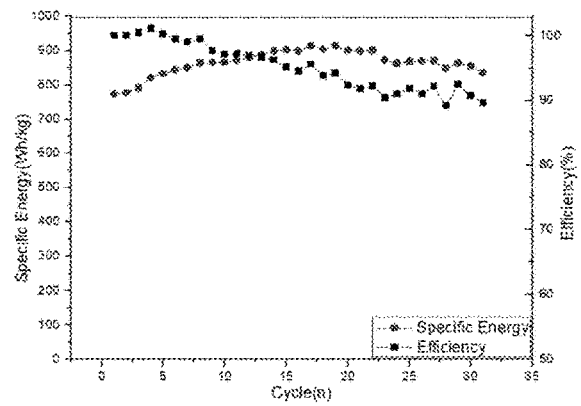
FIG. 8C

LITHIUM SILICATE CATHODES FOR LITHIUM-ION BATTERIES

CROSS REFERENCE TO RELATED APPLICATION

This application is a national phase filing of International Application No. PCT/US2020/021107, filed Mar. 5, 2020, which claims priority to U.S. Provisional Patent Application Ser. No. 62/814,396, filed Mar. 6, 2019, the disclosures of which is are hereby expressly incorporated by reference herein in their entireties.

FIELD OF THE DISCLOSURE

The present disclosure relates generally to lithium-ion (Li-ion) batteries and, more particularly, to lithium iron silicate ($Li_2FeSiO_4$) based cathodes for Li-ion batteries.

BACKGROUND OF THE DISCLOSURE

Since the introduction of Li-ion batteries, the demand for increasingly higher specific capacity and specific energy batteries has steadily increased with the advance of portable electronics, electric vehicles (EVs), hybrid electric vehicles (HEVs) and the like. Likewise, the need for alternative fuel sources has grown over the last decades, due to such factors as the rise of oil prices, the increase in global population, and the pollution generated by internal combustion vehicles. As world population continues to grow, so will the number of vehicles and the demand for more efficient vehicles that require fewer natural resources and generate less pollution.

Advancement in battery technology has made the dream of replacing internal combustion engines with electric motors a reality, reducing the consumption of liquid hydrocarbon fuels. Implementation of battery-powered EVs still faces stiff opposition as they carry a higher cost, still have limited range, and suffer weight parity issues when compared to traditional internal combustion vehicles. Further, the batteries of choice, Li-ion batteries, suffer from short cycle lives and exhibit significant degradation over time, making battery powered vehicles less attractive.

The cathode materials of most Li-ion batteries include transition metal compounds, oxides, or complex oxides. Such transition metal compounds have layered crystal structures (e.g., lithium cobalt oxide ($LiCoO_2$)), spinel crystal structures (e.g., lithium manganese oxide ($LiMn_2O_4$)), or olivine crystal structures (e.g., lithium iron phosphate ($LiFePO_4$)). The transition metal cations typically display four- and/or six-fold coordination with oxygen anions, anionic clusters, or ligands, classified into the full octahedron, full tetrahedron as well as octahedron/tetrahedron hybrid structures.

In operation, $Li^+$ ions are inserted via an electrochemical intercalation reaction. While $Li^+$ ions occupy the space between adjacent layers or unoccupied octahedral or tetrahedral sites, an equal number of electrons enter the available d orbitals of the transition metal cations in the host crystal. Essentially, the oxidation state of metal ions keeps change with the deinsertion accompanying the phase change of these compounds while the $Li^+$ ions remain in ionic state. These materials have some common characteristics: (1) chemical stability, (2) structural stability, and (3) channels allowing the effective diffusion of $Li^+$ ions within the solid oxides. The chemical stability of the cathode material ensures that the host of the cathode does not decompose during the delithiation process while structural stability allows the repeated deintercalation of $Li^+$ ions into the lattices of the host materials. Channels within the materials lead to the high-rate delithiation process within the materials, which in turn is essential for the high rate performance of Li-ion batteries.

The performance characteristics of various cathode materials are summarized in Table 1 below.

TABLE 1

| Cathode | Type | $LiMn_2O_4$ | $LiCoO_2$ | $LiFePO_4$ | $LiNi_xMn_yCo_zO_2$ (NMC) | $Li_2FeSiO_4$ |
|---|---|---|---|---|---|---|
| Potential | Theoretical | 4.2 | 4.0 | 3.5 | 3.7 | 3.5 |
| (V vs $Li/Li^+$) | Practical | 4.0 | 3.8 | 3.3 | 3.5 | 3.0 |
| No. of $Li^+$ | Theoretical | 1 | 1 | 1 | 1 | 2 |
| Intercalated | Practical | 1 | 0.5 | 1 | 0.5 | 2 |
| Specific | Theoretical | 148 | 274 | 175 | 280 | 331 |
| Capacity (mAh/g) | Practical | 120 | 145 | 165 | 170 | 305 |
| Specific Energy | Theoretical | 622 | 1096 | 613 | 1036 | 1158 |
| (Wh/kg) | Practical | 480 | 551 | 545 | 595 | 915 |
| Relative Cost ($/kg) | | 30 | 60 | 30 | 65 | 30 |

A particularly attractive cathode material for Li-ion batteries is $Li_2FeSiO_4$, which has a high specific capacity with two $Li^+$ ion insertion and a high specific energy (See Table 1). Additionally, $Li_2FeSiO_4$ is chemically stable, safe, non-toxic, and affordable (See Table 1). However, the practical applications of $V_2O_5$ have been limited due to: (1) low electrical conductivity due to its tetrahedron structure, (2) slow $Li^+$ ion diffusion, (3) structural instability during the repeated delithiation processes due to weaknesses in its tetrahedron structure, and (4) interfacial instability due to the high charging voltage for driving the $Li^+$ ions into the stable $FeSiO_4$ network. Efforts have been made to improve the performance of $Li_2FeSiO_4$, including porous nanostructures, cation doping in crystals, carbon coating or fabrication of carbonaceous matrices, incorporation of reduced graphene, conductive inorganic compounds, or organic polymers. Although these efforts have improved the performance of $Li_2FeSiO_4$ to a certain degree, these efforts have not significantly improved the specific capacity, structural stability, and cycle life to the level of practical application.

For these reasons, there is a need for a cathode material for Li-ion batteries that takes advantage of the benefits of $Li_2FeSiO_4$ while addressing its inherent drawbacks in a comprehensive manner.

SUMMARY

The present disclosure provides an improved nanocomposite cathode material for lithium-ion batteries and method of making the same. The nanocomposite cathode material includes $Li_2FeSiO_4$-based nanoparticles with a conductive matrix of graphene sheets. The nanoparticles may be doped with at least one anion or cation.

According to an embodiment of the present disclosure, an electrode material is provided including a conductive matrix comprising a plurality of graphene sheets, and a plurality of $Li_2FeSiO_4$-based nanoparticles coupled to the conductive matrix.

According to another embodiment of the present disclosure, a method is provided for making an electrode material, the method including: preparing a solution containing a lithium oxide, a silicon oxide, and iron; adding graphene oxide to the solution; heating the solution to produce a plurality of $Li_2FeSiO_4$-based nanoparticles over the graphene oxide; and sintering the nanoparticles to reduce the graphene oxide to graphene and produce a nanocomposite material.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein:

FIGS. 4A-4C are transmission electron microscopy images of $Li_2FeSiO_4$-based particles alone, with graphene, and with graphene and fluorine dopants, respectively, in accordance with the examples;

FIGS. 8A-8C graphically illustrate electrochemical test results for electrodes made with graphene and fluorine dopants in accordance with the examples;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
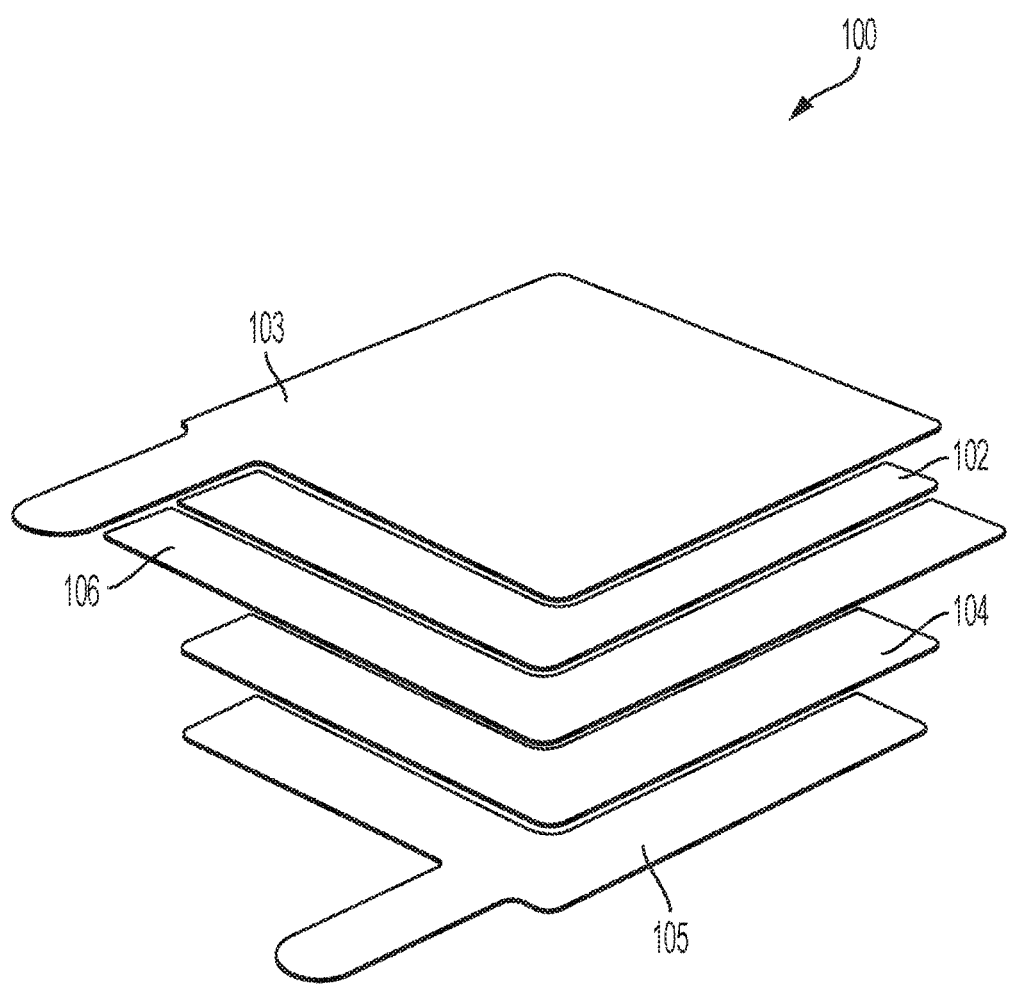
FIG. 1 is a schematic view of a Li-ion battery of the present disclosure.

FIG. 1 provides a Li-ion battery 100 including an anode 102 coupled to an anode current collector 103, a cathode 104 coupled to a cathode current collector 105, and an electrolyte-filled separator 106. In one particular example, the anode 102 comprises Li metal or graphite and the electrolyte comprises a solution of $LiPF_6$ in a mixture of ethylene carbonate (EC) and ethyl methyl carbonate (EMC), but sulfone-based, ionic liquid-based, nitrile-based, or other electrolytes can also be used. The illustrative battery 100 is a pouch cell, but the battery 100 may also be a cylindrical cell, a coin cell, or a prismatic cell, for example. The battery 100 may be configured for use in a portable electronic device, an electric vehicle, an energy storage device, or other electronic devices.

Figure 2:
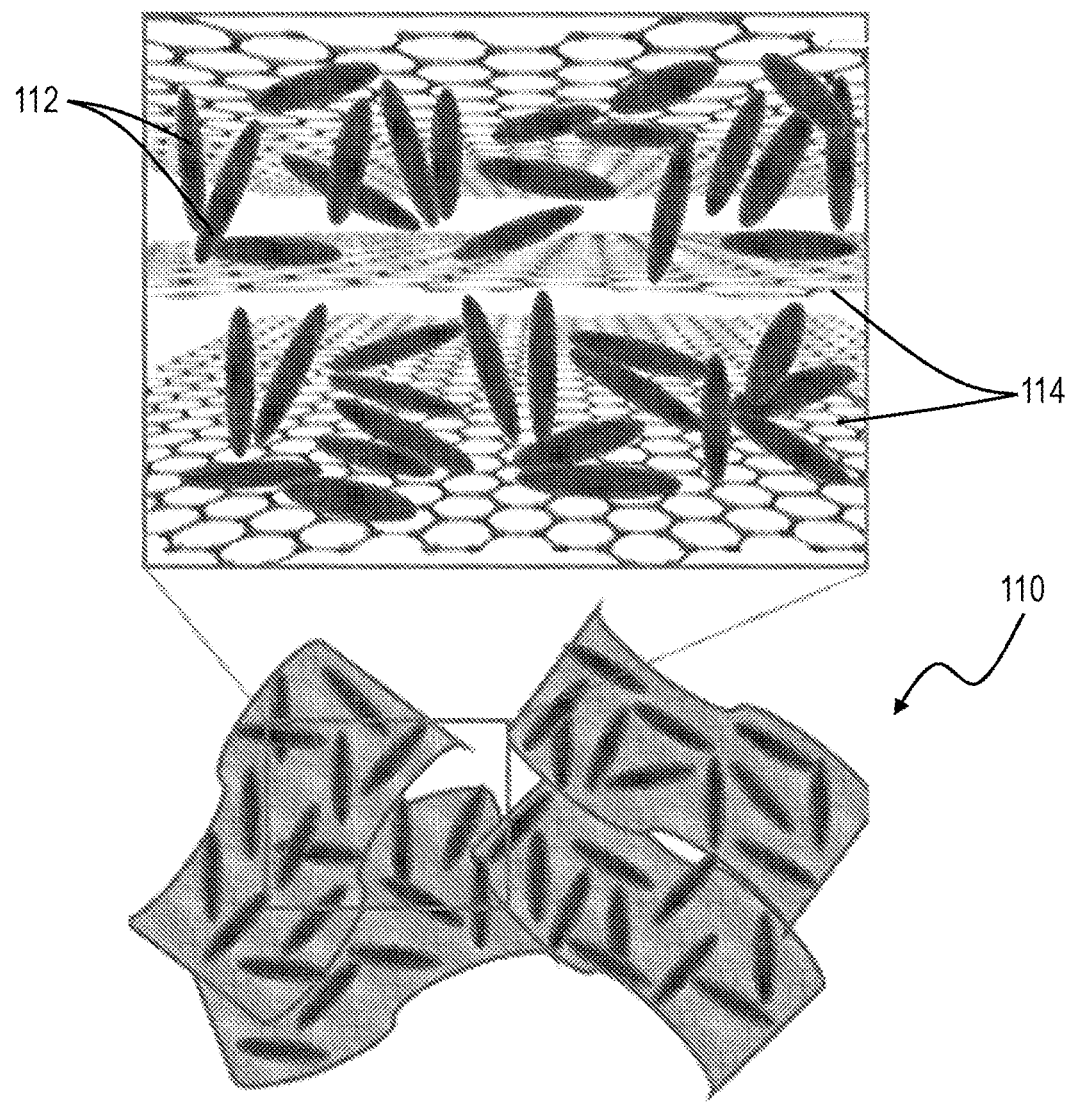
FIG. 2 is a schematic view of an exemplary $Li_2FeSiO_4$-based/Graphene nanocomposite material of the present disclosure.

FIG. 2 provides an improved $Li_2FeSiO_4$-based/Graphene nanocomposite cathode material 110 for cathode 104 of battery 100 (FIG. 1). Advantageously, the $Li_2FeSiO_4$-based/Graphene nanocomposite cathode material 110 may have an initial specific energy of 600 Wh/kg, may have a cycle life of at least 1,000 cycles, and may lack cobalt, nickel, and manganese.

As shown in FIG. 2, the $Li_2FeSiO_4$-based/Graphene nanocomposite cathode material 110 includes $Li_2FeSiO_4$-based nanoparticles 112 (e.g., nanorods) formed upon a conductive matrix of graphene sheets 114. The graphene sheets 114 may improve the electrical conductivity of the nanocomposite cathode material 110 compared to the $Li_2FeSiO_4$-based nanoparticles 112 alone. Additionally, the graphene sheets 114 may provide a structural matrix to anchor and stabilize the $Li_2FeSiO_4$-based nanoparticles 112 and reduce grain stress during charge/discharge cycling, leading to better cycle life. As shown in FIG. 2, each graphene sheet 114 includes a single-layer of graphene with $sp^2$-bonded carbon atoms arranged in a honeycomb crystal structure and can be viewed as an individual atomic plane of a graphite structure. Each carbon atom in the graphene uses 3 of 4 valence band (2s, 2p) electrons (which occupy the $sp^2$ orbits) to form 3 covalent bonds with the neighboring carbon atoms in the same plane. Each carbon atom in the graphene contributes its fourth lone electron (occupying the $p_z$ orbit) to form a delocalized electron system, a long-range π-conjugation system shared by all carbon atoms in the graphene plane. Such a long-range π-conjugation in graphene yields extraordinary electrical, mechanical, and thermal properties in the nanocomposite cathode material 110. The nanocomposite cathode material 110 exhibits improved intraparticle electronic conduction because of good electrical conductivity of graphene, and $Li^+$ ion diffusion is improved because diffusion length is shortened. Furthermore, the small grain size of the $Li_2FeSiO_4$-based nanoparticles 112 in the nanocomposite cathode material 110 reduces internal stress, leading to better structure stability and cycle life. According to an exemplary embodiment of the present disclosure, the nanocomposite cathode material 110 may comprise about 1 wt. % to about 10 wt. % graphene, more specifically about 1 wt. % to about 5 wt. % graphene, more specifically about 2 wt. % graphene. The graphene content should be sufficiently low to maintain the graphene as single sheets and avoid re-stacking. Additional information regarding the incorporation of graphene sheets 114 is disclosed in U.S. Publication No. 2015/0380732, the disclosure of which is expressly incorporated herein by reference in its entirety.

In certain embodiments, the graphene sheets 114 may be modified with one or more functional groups (e.g., —OH, —COOH, —NH). For example, the functional groups may be covalently grafted onto the surface of the graphene sheets 114 through diazonium salt via a diazonium reaction. The diazonium reaction-based functionalization may provide a simple and cost-effective way to transform the pure graphene sheets 114 into hierarchical and functional materials that can provide the desired properties (i.e. hydrophobicity, $Li^+/e^-$ conductivity, $Li^+$ diffusivity, nanoparticle dispersion, local electric field, etc.) to enhance binding with the adjacent $Li_2FeSiO_4$-based nanoparticles 112.

The $Li_2FeSiO_4$-based nanoparticles 112 may also include one or more optional dopants, including anion dopants (X) and/or cation dopants (Y). The dopants X, Y, may alter the crystalline structure and, consequently, the electrochemical performance of the $Li_2FeSiO_4$-based nanoparticles 112. The types of dopants X, Y, the doping order, and the amount of dopants X, Y may be varied to achieve a desired specific capacity/energy and cycle life. According to an exemplary embodiment of the present disclosure, the $Li_2FeSiO_4$-based nanoparticles 112 may have an anion doping ratio of anion dopants X to oxygen (O) and/or a cation doping ratio of cation dopants Y to iron (Fe). The doping ratios may be about 30% or less by weight, more specifically about 2% by weight to about 20% by weight, and more specifically about 2% by weight to about 10% by weight.

Examples of suitable anion dopants X include halogen ions, such as fluorine ions ($F^-$), chlorine ions ($Cl^-$), and bromine ions ($Br^-$). Such anion dopants X may have a larger electronegativity than oxygen (O) and may reduce the formation of ligand holes during delithiation, which may stabilize the crystalline structure by reducing the extent of an $O^{2-} \rightarrow O_2^{2-}$ reaction during delithiation. Also, such anion dopants X may also have a high redox potential (e.g., 2.87 V for F), which may help to increase the discharge potential of the nanocomposite cathode material 110 in the Li-ion battery 100 (FIG. 1).

Examples of suitable cation dopants Y include titanium ions ($Ti^{+4}$), manganese ions ($Mn^{+2}$), copper ions ($Cu^{+2}$), terbium ions ($Tb^{+3}$), niobium ions ($Nb^{+5}$), and molybdenum ions ($Mo^{+4}$). Such cation dopants Y may improve the structure stability of the $Li_2FeSiO_4$-based nanoparticles 112 by enhancing the coupling effect among the $Li_2FeSiO_4$-based tetrahedra via strong d-orbital hybridization. In this way, the dopants Y may function like springs to contain the tetrahedra and prohibit structural fracture. Consequently, the dopants Y may achieve much improved cycle life.

The $Li_2FeSiO_4$-based/Graphene nanocomposite cathode material 110 may have the following Formula (F-I):

$$Li_2Fe_{1-d}Y_cSiO_{4-b}X_a/Graphene \quad (F-I)$$

wherein:
X=anion dopant;
Y=cation dopant;
a≥0;
b=f(a)
c≥0; and
d=f(c).

Examples of suitable $Li_2FeSiO_4$-based/Graphene nanocomposite cathode materials 110 are listed in Table 2 below.

TABLE 2

| Material | X | b | Y | d |
|---|---|---|---|---|
| $Li_2FeSiO_4$/Graphene | — | 0 | — | 0 |
| $Li_2FeSiO_{4-a/2}F_a$/Graphene | F | a/2 | — | 0 |
| $Li_2Fe_{1-c}Mn_cSiO_4$/Graphene | — | 0 | Mn | c |
| $Li_2Fe_{1-c}Cu_cSiO_4$/Graphene | — | 0 | Cu | c |
| $Li_2Fe_{1-2.5c}Nb_cSiO_4$/Graphene | — | 0 | Nb | 2.5c |
| $Li_2Fe_{1-2.5c}Nb_cSiO_{4-a/2}F_a$/Graphene | F | a/2 | Nb | 2.5c |

Figure 3:
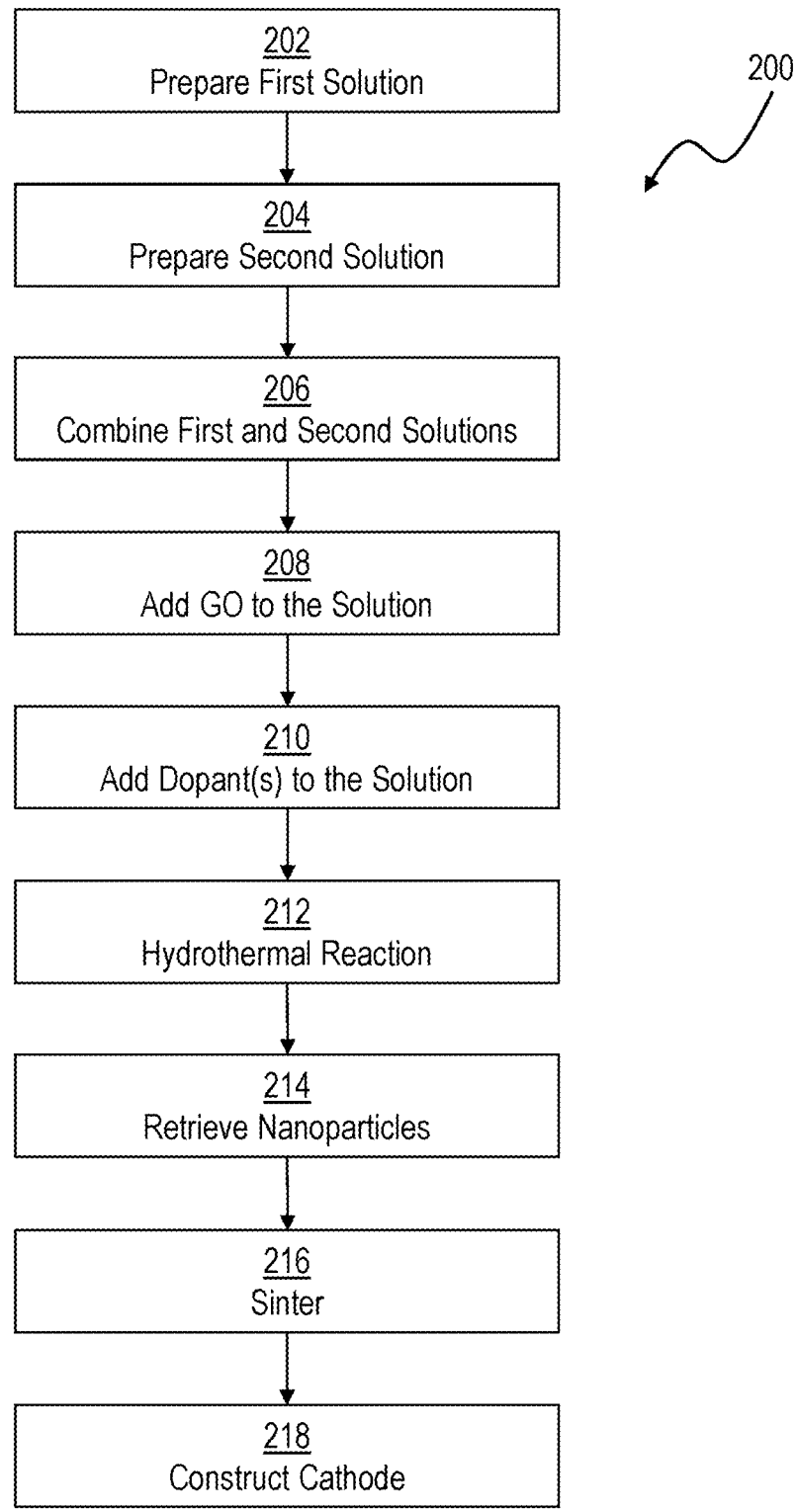
FIG. 3 is a flow chart illustrating an exemplary method for preparing the $Li_2FeSiO_4$-based/Graphene material.

FIG. 3 provides an exemplary method 200 for synthesizing the $Li_2FeSiO_4$-based/Graphene nanocomposite cathode material 110 (FIG. 2) and constructing the cathode 104 (FIG. 1). The method 200 may involve a hydrothermal synthesis process.

In step 202, a first solution is prepared including a lithium oxide, specifically lithium hydroxide (LiOH), and a silicon oxide, specifically silica ($SiO_2$), in a suitable solvent such as distilled water. The $SiO_2$ may be provided in the form of nanoparticles, also referred to herein as nano-$SiO_2$.

In step 204, a second solution is prepared including an iron compound, specifically iron dichloride ($FeCl_2$), in a suitable solvent such as distilled water.

In step 206, the first and second solutions are combined. In certain embodiments, the second solution is added dropwise to the first solution. The combined solutions may be stirred together for about 30 minutes, about 1 hour, or longer before proceeding to the next step.

In step 208, a graphene oxide (GO) solution is added to the combined solution from step 206. The GO solution may be prepared using a modified Hummer's method, as disclosed in Example 1 below, for example. In certain embodiments, the GO solution is added dropwise to the combined solution from step 206. The resulting solution may be stirred together for about 30 minutes, about 1 hour, or longer before proceeding to the next step.

In step 210, a salt of any desired dopant X, Y is added to the resulting solution from step 208. Examples of suitable salts include ammonium fluoride ($NH_4F$) for the F-dopant, cupric chloride ($CuCl_2$) for the Cu-dopant, and niobium hydroxide ($Nb(OH)_5$) for the Nb-dopant. The dopant X, Y may be present in a desired concentration relative to the $Li_2FeSiO_4$.

In step 212, the solution is reacted to produce optionally doped, $Li_2FeSiO_4$-based nanoparticles 112 (FIG. 2) over the GO. This reacting step 210 may be a hydrothermal step that is performed in an autoclave or another suitable heated environment. The temperature of the reacting step 210 may be about 160° C., about 180° C., about 200° C., or more, but this temperature may vary. The duration of the reacting step 210 may be about 5 hours, about 10 hours, about 15 hours, or more, but this duration may vary. After the reacting step 210 is completed, the autoclave may be allowed to return to room temperature before removing the products.

The reacting step 212 may produce $Li_2FeSiO_4$-based nanoparticles 112 upon the GO according to Reactions (R-I) thru (R-III), represented overall by Reaction (R). The Reaction (R) may be modified as appropriate to incorporate any desired dopants.

$$2LiOH + SiO_2 \rightarrow Li_2SiO_3 \cdot H_2O \quad (R\text{-}I)$$

$$FeCl_2 + 2LiOH \rightarrow Fe(OH)_2 + 2LiCl \quad (R\text{-}II)$$

$$Fe(OH)_2 + Li_2SiO_3 \cdot H_2O \rightarrow Li_2FeSiO_4 + 2H_2O \quad (R\text{-}III)$$

$$4LiOH + SiO_2 + FeCl_2 \rightarrow Li_2FeSiO_4 + 2H_2O + 2LiCl \quad (R)$$

In step 214, the $Li_2FeSiO_4$-based nanoparticles 112 produced during the reacting step 212 are separated and cleaned. This step 214 may involve: removing the precipitated nanoparticles 112 from the aqueous solution, such as by filtering or drying; rinsing the nanoparticles 112 with deionized water or another suitable rinsing agent; and drying the nanoparticles 112, such as by subjecting the nanoparticles 112 to an elevated temperature and/or a vacuum environment for several hours or more.

In step 216, the $Li_2FeSiO_4$-based/Graphene nanocomposite cathode material 110 is formed by sintering the $Li_2FeSiO_4$-based nanoparticles 112 upon the GO, which reduces the GO to graphene 114 (FIG. 2). The sintering step 112 may be performed in an inert atmosphere, such as argon (Ar). The temperature of the sintering step 216 may be about 500° C., about 600° C., about 700° C., or more, but this temperature may vary. The duration of the sintering step 216 may be about 5 hours, about 10 hours, about 15 hours, or more, but this duration may vary.

In step 218, the cathode 104 (FIG. 1) is constructed using the $Li_2FeSiO_4$-based/Graphene nanocomposite cathode material 110 from the sintering step 216. The constructing step 218 may involve preparing a slurry. In one example, the slurry contains about 80 wt. % $Li_2FeSiO_4$-based/Graphene nanocomposite cathode material 110, about 10 wt. % polyvinylidence difluoride (PVDF), and about 10 wt. % carbon black. Next, the slurry may be sprayed onto or otherwise applied to the cathode current collector 105, such as a 10 μm thick aluminum (Al) foil. Then, the cathode 104 may be dried in a vacuum oven, such as at a temperature of about 90° C. and a duration of about 24 hours.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

EXAMPLES

1. Preparation of GO Solution

A GO solution was prepared using a modified Hummer's method. 2 grams of graphite flakes were mixed with 10 mL of concentrated $H_2SO_4$, 2 grams of $(NH_4)_2S_2O_8$, and 2 grams of $P_2O_5$. The obtained mixture was heated at 80° C. for 4 hours under constant stirring. Then the mixture was filtered and washed thoroughly with DI water. After drying in an oven at 80° C. overnight, this pre-oxidized graphite was then subjected to oxidation using the Hummer's method. 2 grams of pre-oxidized graphite, 1 gram of sodium nitrate and 46 mL of sulfuric acid were mixed and stirred for 15 minutes in an iced bath. Then, 6 grams of potassium permanganate was slowly added to the obtained suspension solution for another 15 minutes. After that, 92 mL DI water was slowly added to the suspension, while the temperature was kept constant at about 98° C. for 15 minutes. After the suspension has been diluted by 280 mL DI water, 10 mL of 30% $H_2O_2$ was added to reduce the unreacted permanganate. Finally, the resulted suspension was centrifuged several times to remove the unreacted acids and salts. The purified GO were dispersed in DI water to form a 0.2 mg/mL solution by sonication for 1 hour. Then the GO dispersion was subjected to another centrifugation in order remove the un-exfoliated GO. The resulted GO dilute solution could remain in a very stable suspension without any precipitation for a few months.

2. Synthesis of $Li_2FeSiO_4$

First, 16 mmol LiOH and 4 mmol nano-$SiO_2$ were dissolved in 30 mL distilled water to produce Solution 2-A, and 4 mmol $FeCl_2.4H_2O$ was dissolved in another 20 mL distilled water to produce Solution 2-B. After 1 h stirring, the aqueous Solution 2-B was added dropwise in Solution 2-A with continued stirring for 4 h to produce Solution 2-C.

Then, Solution 2-C was transferred into a 100 mL Teflon-lined stainless-steel autoclave. After sealing, the autoclave was maintained at 180° C. for 12 h to produce $Li_2FeSiO_4$.

Finally, when the reaction was completed, the autoclave was cooled to room temperature naturally. The precipitates were filled and washed with DI water several times and finally dried at 60° C. for 12 h in vacuum. The pure $Li_2FeSiO_4$ was sintered at 600° C. for 10 h in argon (Ar) atmosphere.

Using transmission electron microscopy (TEM), the $Li_2FeSiO_4$ particles measured about 15 nm in diameter (FIG. 4A).

3. Synthesis of Undoped $Li_2FeSiO_4$/Graphene

First, 16 mmol LiOH and 4 mmol nano-$SiO_2$ were dissolved in 30 mL distilled water to produce Solution 3-A, and 4 mmol $FeCl_2.4H_2O$ was dissolved in another 20 mL distilled water to produce Solution 3-B. After 1 h stirring, the aqueous Solution 3-B was added dropwise in Solution 3-A with continued stirring for 4 h to produce Solution 3-C.

Next, a 5 mg/mL GO gel was prepared according to Example 1. 20 mL of the GO gel was dropped in Solution 3-C with continued stirring for 1 h.

Then, the mixture was transferred into a 100 mL Teflon-lined stainless-steel autoclave. After sealing, the autoclave was maintained at 180° C. for 12 h to produce $Li_2FeSiO_4$ upon the GO.

Finally, when the reaction was completed, the autoclave was cooled to room temperature naturally. The precipitates were filled and washed with DI water several times and finally dried at 60° C. for 12 h in vacuum. The $Li_2FeSiO_4$/GO was sintered at 600° C. for 10 h in Ar atmosphere to reduce the GO to graphene.

Using TEM, the undoped $Li_2FeSiO_4$/Graphene particles appeared as nanorods and measured about 5 nm in diameter and about 10-30 nm in length (FIG. 4B).

4. Synthesis of 2% Mn-Doped $Li_2Fe_{0.98}Mn_{0.02}SiO_4$/Graphene

First, 16 mmol LiOH and 4 mmol nano-$SiO_2$ were dissolved in 30 mL distilled water to produce Solution 4-A, and 3.92 mmol $FeCl_2.4H_2O$ and 0.08 mmol $MnCl_2.4H_2O$ as the Mn-dopant were dissolved in another 20 mL distilled water to product Solution 4-B. After 1 h stirring, the aqueous Solution 4-B was added dropwise in Solution 4-A with continued stirring for 4 h to produce Solution 4-C.

Next, a 5 mg/mL GO gel was prepared according to Example 1. 20 mL of the GO gel was dropped in Solution 4-C with continued stirring for 1 h.

Then, the mixture was transferred into a 100 mL Teflon-lined stainless-steel autoclave. After sealing, the autoclave was maintained at 180° C. for 12 h to produce $Li_2Fe_{0.98}Mn_{0.02}SiO_4$ upon the GO according to the following Mn-doped variation of Reaction (R):

$$4LiOH+SiO_2+(1-d)FeCl_2+cMnCl_2\cdot 4H_2O \rightarrow Li_2Fe_{1-d}Mn_cSiO_4+(4c+2)H_2O+2(1-d+c)LiCl$$

wherein:

c=0.02; and d=c=0.02.

Finally, when the reaction was completed, the autoclave was cooled to room temperature naturally. The precipitates were filled and washed with DI water several times and finally dried at 60° C. for 12 h in vacuum. The $Li_2Fe_{0.98}Mn_{0.02}SiO_4$/GO was sintered at 600° C. for 10 h in Ar atmosphere to reduce the GO to graphene. The doping ratio of Mn/Fe was 2% by weight, calculated as (0.02*54.938)/(0.98*55.845).

5. Synthesis of 15% F-Doped $Li_2FeSiO_{3.76}F_{0.48}$/Graphene and 6% F-Doped $Li_2FeSiO_{3.9}F_{0.2}$/Graphene First, 16 mmol LiOH and 3.76 mmol nano-$SiO_2$ were dissolved in 30 mL distilled water to produce Solution 5-A, and 4 mmol $FeCl_2 \cdot 4H_2O$ was dissolved in another 20 mL distilled water to produce Solution 5-B. After 1 h stirring, the aqueous Solution 5-B was added dropwise in Solution 5-A with continued stirring for 4 h to produce Solution 5-C.

Next, a 5 mg/mL GO gel was prepared according to Example 1. 20 mL of the GO gel was dropped in Solution 5-C with continued stirring for 1 h. In addition to the GO, 0.48 mmol $NH_4F$ as the F-dopant was added to Solution 5-C and stirred for 5 mins.

Then, the mixture was quickly transferred to a 100 mL Teflon-lined stainless-steel autoclave. After sealing, the autoclave was maintained at 180° C. for 12 h to produce $Li_2FeSiO_{3.76}F_{0.48}$ upon the GO according to the following F-doped variation of Reaction (R):

$$4LiOH + SiO_2 + FeCl_2 + aNH_4F \rightarrow Li_2FeSiO_{4-b}F_a + aNH_3\uparrow + (2+b)H_2O + 2LiCl$$

wherein:
a=0.48; and
b=a/2=0.24.

Finally, when the reaction was completed, the autoclave was cooled to room temperature naturally. The precipitates were filled and washed with DI water several times and finally dried at 60° C. for 12 h in vacuum. The $Li_2FeSiO_{3.76}F_{0.48}$/GO was sintered at 600° C. for 10 h in Ar atmosphere to reduce the GO to graphene. The doping ratio of F/O was 15% by weight, calculated as (0.48*18.998)/(3.76*15.999).

Using TEM, the F-doped $Li_2FeSiO_{3.76}F_{0.48}$/Graphene particles appeared as nanorods (FIG. 4C) and measured even smaller in particle size than the undoped $Li_2FeSiO_4$/Graphene particles (FIG. 4B).

A similar process was performed to produce F-doped particles with other doping ratios from 2% by weight to 10% by weight. For example, F-doped $Li_2FeSiO_{3.9}F_{0.2}$/Graphene particles were produced having a doping ratio of F/O of 6% by weight, calculated as (0.2*18.998)/(3.9*15.999).

6. Preparation of $Li_2FeSiO_4$—Based Electrodes

Cathodes were prepared using the various $Li_2FeSiO_4$-based nanocomposite cathode materials from Examples 2-5. Each material was slurried with 10% carbon black (Super P™ Conductive Carbon Black, TIMCAL) and 10% PVDF, sprayed onto a 10 μm thick Al foil, placed in a vacuum oven, and allowed to dry at 90° C. for 24 hours. The resulting cathodes were assembled into R2016 coin cells using Li metal anodes and dielectric separators with electrolytes including 1.0 M $LiPF_6$ in a 3:7 by weight solvent mixture of EC and EMC.

7. Electrochemical Performance of F-Doped Electrodes

The F-doped $Li_2FeSiO_4$-based electrodes were subjected to electrochemical testing. The 6% F-doped $Li_2FeSiO_{3.9}F_{0.2}$/Graphene electrodes from Example 5 (labeled F-LFSO-G) exhibited better overall performance than the undoped $Li_2FeSiO_4$/Graphene electrodes from Example 3 (labeled LFSO-G), which exhibited better overall performance than the pure $Li_2FeSiO_4$ electrodes from Example 2 (labeled LFSO-blank). The electrochemical test results are presented in FIGS. 5A-5D and are summarized in Table 3 below.

TABLE 3

| Electrode Material | Doping Ratio (to O) | Discharge Capacity (mAh/g) | Cycle Life (at 600 Wh/kg) | Specific Energy (Wh/kg; at ⅓ C) | Diffusion (cm²/s) |
|---|---|---|---|---|---|
| $Li_2FeSiO_4$ | 0% | 188 | <10 | <250 | |
| $Li_2FeSiO_4$/Graphene | 0% | 247 | 42 | <550 | $2.90 \times 10^{-16}$ |
| $Li_2FeSiO_{3.9}F_{0.2}$/Graphene | 6% | 305 | 63 | 720 | $2.21 \times 10^{-12}$ |

Figure 5A:
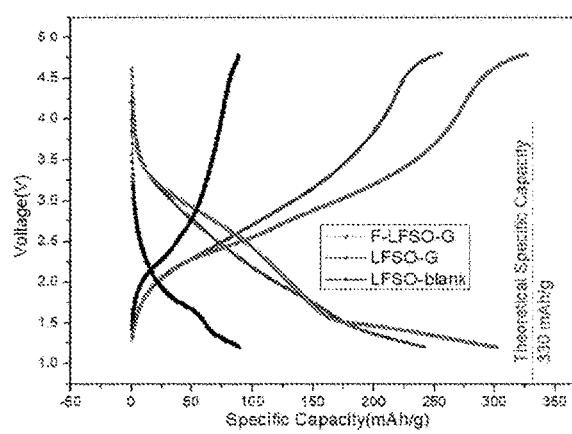
FIGS. 5A-5D graphically illustrate electrochemical test results for electrodes made from the $Li_2FeSiO_4$-based particles of FIGS. 4A-4C, in accordance with the examples.
Figure 5B:
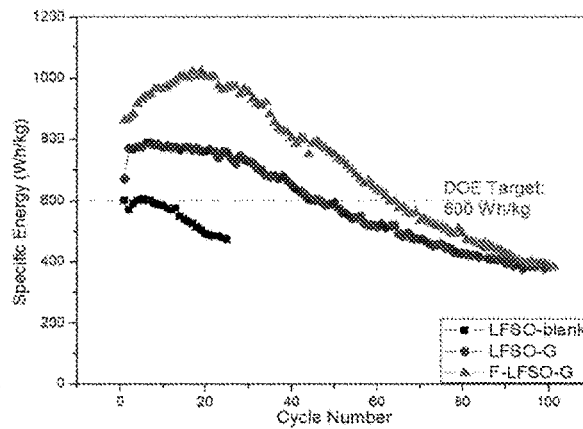
Figure 5C:
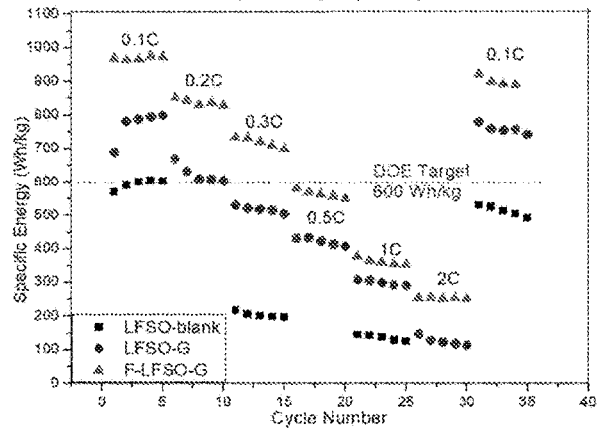
Figure 5D:
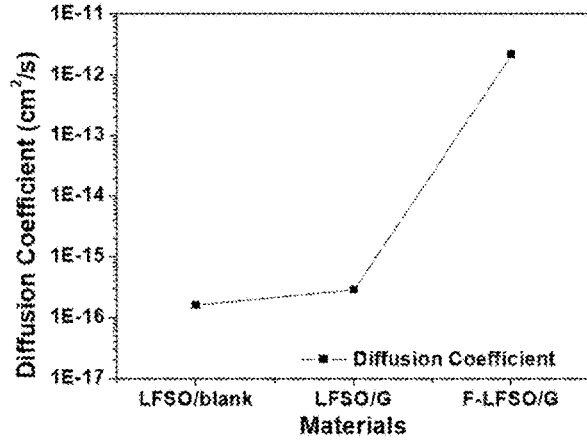

A surprising phenomenon was seen in the specific capacity/energy of the $Li_2FeSiO_{3.9}F_{0.2}$/Graphene electrodes, where the specific energy increased during the first 25 cycles from 830 Wh/kg to 1020 Wh/kg before decreasing (FIG. 5B).

Figure 6:
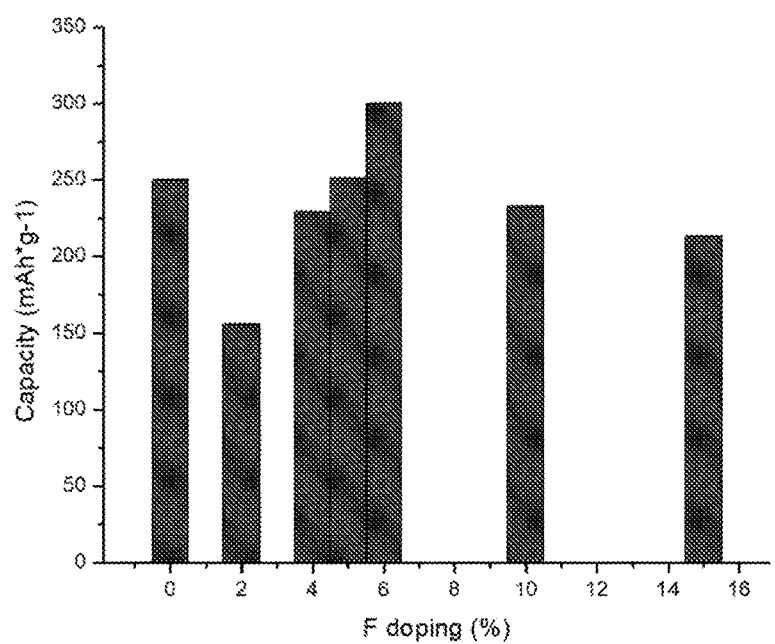
FIG. 6 graphically illustrates capacity data at different fluorine doping ratios in accordance with the examples.
Figure 7:
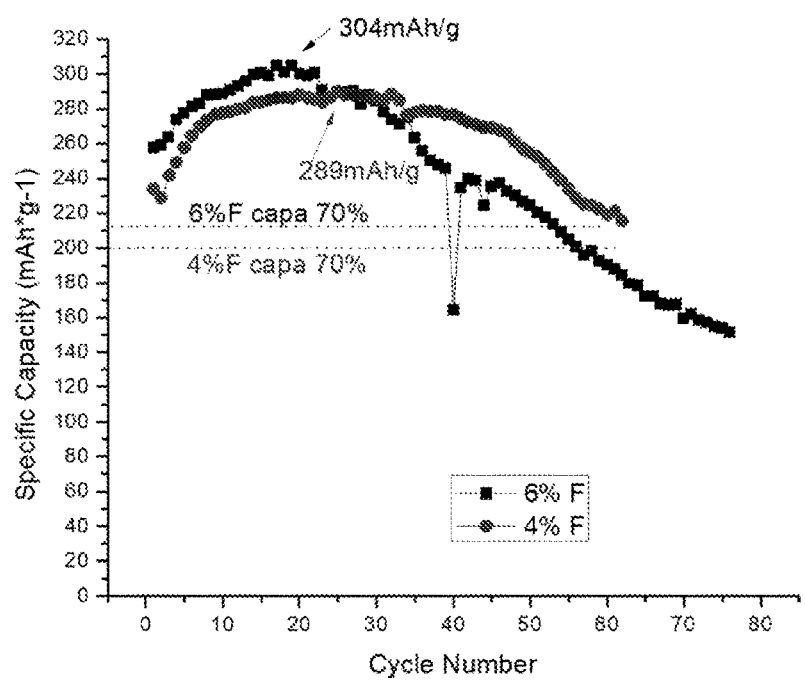
FIG. 7 graphically illustrates cycle life data at different fluorine doping ratios in accordance with the examples.

The capacity results for the other F-doped $Li_2FeSiO_4$-based electrodes referenced in Example 5 are presented in FIG. 6. The 6% F-doped electrode showed the highest capacity. However, the additional F-dopant had a negative impact on cycle life, as shown by comparing the 4% F-doped results to the 6% F-doped results in FIG. 7.

The 6% F-doped electrode was subjected to further electrochemical testing at 0.1C, and the results are presented in FIGS. 8A-8C.

8. Electrochemical Performance of Mn-Doped Electrodes

Figure 9A:
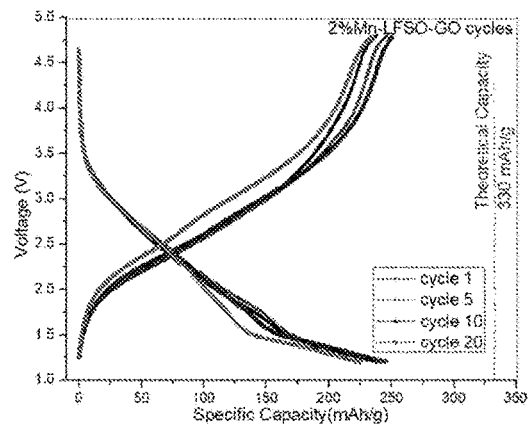
FIGS. 9A-9C graphically illustrate electrochemical test results for electrodes made with graphene and manganese dopants in accordance with the examples.
Figure 9B:
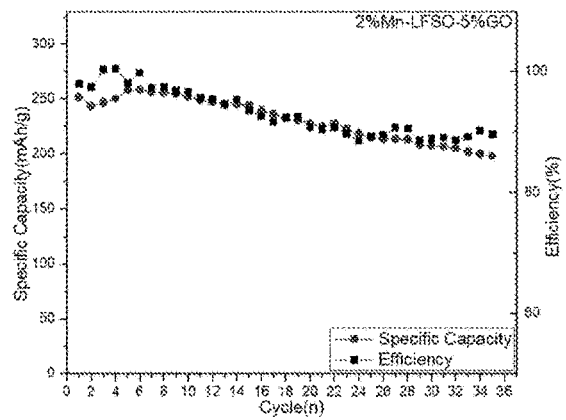
Figure 9C:
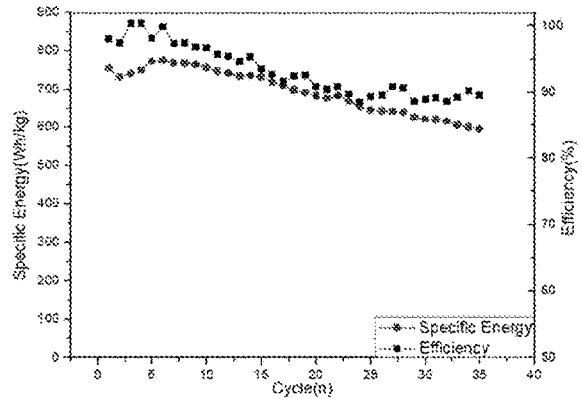

The 2% Mn-doped $Li_2FeSiO_4$-based electrodes from Example 4 were subjected to electrochemical testing at 0.1C, and the results are presented in FIGS. 9A-9C.

Figure 10:
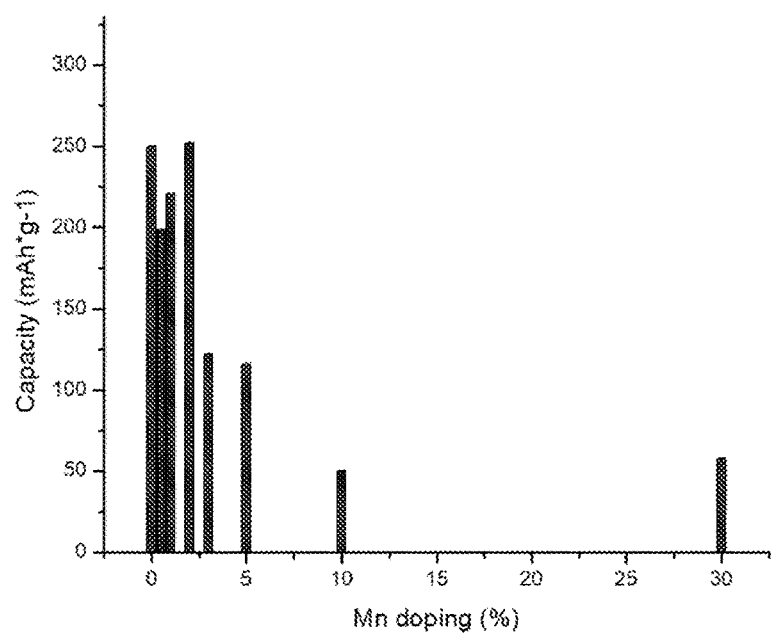
FIG. 10 graphically illustrates capacity data at different manganese doping ratios in accordance with the examples.

Similar Mn-doped $Li_2FeSiO_4$-based electrodes were prepared with different Mn-doping ratios from 0.5% by weight to 30% by weight, and the comparative capacity results are presented in FIG. 10. The 2% Mn-doped electrode showed the highest capacity.

9. Electrochemical Performance of Other Cation-Doped Electrodes

Other $Li_2FeSiO_4$-based electrodes were prepared with cations other than Mn at different doping ratios. The comparative capacity results are presented in Table 4.

TABLE 4

| Doping Ratio (to Fe) | Specific Capacity (mAh/g) | | | |
|---|---|---|---|---|
| | Ti | Cu | Nb | Mo |
| 2% | 259 | 258 | 271 | 169 |
| 5% | 142 | 269 | 282 | 151 |
| 8% | 248 | 286 | 307 | 236 |

10. Electrochemical Performance of Hybrid-Doped Electrodes

Figure 11:
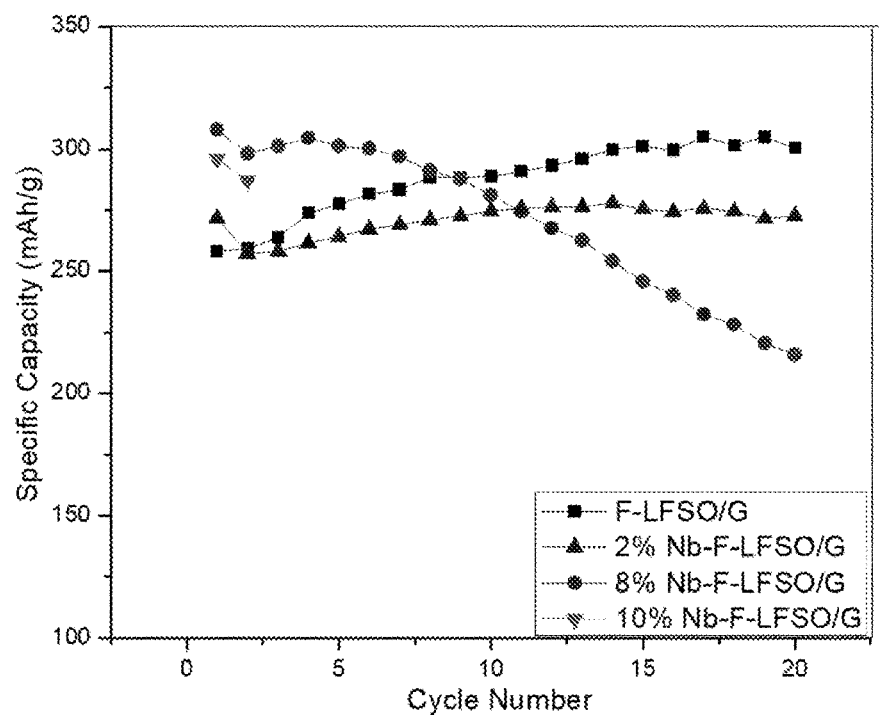
FIG. 11 graphically illustrates cycle life data at different niobium doping ratios in accordance with the examples.
Figure 12:
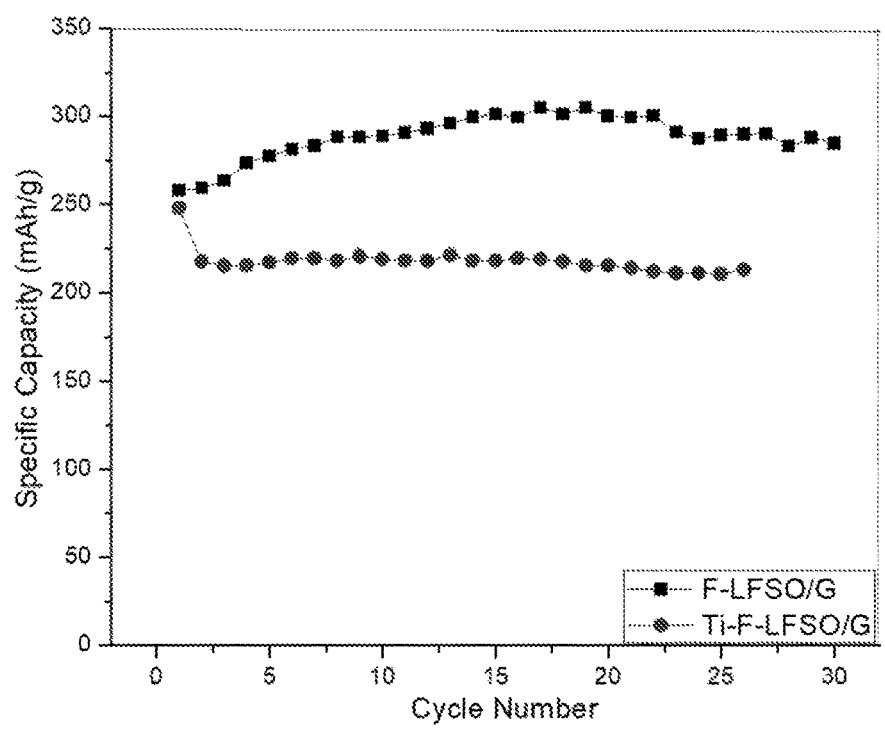
FIG. 12 graphically illustrates cycle life data at different titanium doping ratios in accordance with the examples.

Other $Li_2FeSiO_4$-based electrodes were prepared with both anion and cation dopants, specifically 6% F-dopant and from 2% to 10% cation dopant. The initial cycle life data for 6% F-2% Ti hybrids and 6% F-2% Cu hybrids is presented in Table 5. The cycle life data for 6% F-2% Nb, 6% F-8% Nb, and 6% F-10% Nb hybrids is presented in FIG. 11. The cycle life data for 6% F-8% Ti hybrids is presented in FIG. 12. In general, the cation dopants may improve cycle life compared to F-dopants alone.

TABLE 5

| Dopants | Specific Capacity (mAh/g) | | |
|---|---|---|---|
| | 1 | 2 | 3 |
| 6%F—2%Ti | 259 | 240 | 246 |
| 6%F—2%Cu | 258 | 235 | 243 |

What is claimed is:

1. An electrode material comprising:
   a conductive matrix comprising a plurality of graphene sheets;
   a plurality of lithium iron silicate based nanoparticles coupled to the conductive matrix, wherein the lithium iron silicate based nanoparticles have the formula:

$Li_2FeSiO_{3.9}F_{0.2}$.

2. The electrode material of claim 1, wherein the electrode material comprises about 1 wt. % to about 10 wt. % of the graphene sheets.

3. The electrode material of claim 2, wherein the electrode material comprises about 2 wt. % of the graphene sheets.

4. A battery comprising an electrode with the electrode material of claim 1.

5. The battery of claim 4, wherein the battery is configured for use in a portable electronic device, an electric vehicle, or an energy storage device.

6. The battery of claim 4, wherein the electrode lacks cobalt, nickel, and manganese.

7. A method of making the electrode material of claim 1, the method comprising:
   preparing a solution containing a lithium oxide, a silicon oxide, and an iron compound;
   adding graphene oxide to the solution;
   adding a dopant to the solution;
   heating the solution to produce the lithium iron silicate based nanoparticles over the graphene oxide; and
   sintering the lithium iron silicate based nanoparticles to reduce the graphene oxide to graphene and produce a nanocomposite material comprising the lithium iron silicate based nanoparticles coupled to the conductive matrix.

8. The method of claim 7, wherein the lithium oxide of the preparing step is lithium hydroxide, the silicon oxide is silica, and the iron compound is iron dichloride.

9. The method of claim 7, wherein the temperature of the heating step is about 160° C. or more.

10. The method of claim 7, further comprising constructing a cathode with the nanocomposite material.

* * * * *